March 31, 1970 — F. G. LUDWIG — 3,503,678
FILM ALIGNMENT DEVICE AND PAPER ENGAGEMENT DEVICE FOR PHOTOCOPY EQUIPMENT
Filed March 1, 1967 — 2 Sheets-Sheet 1
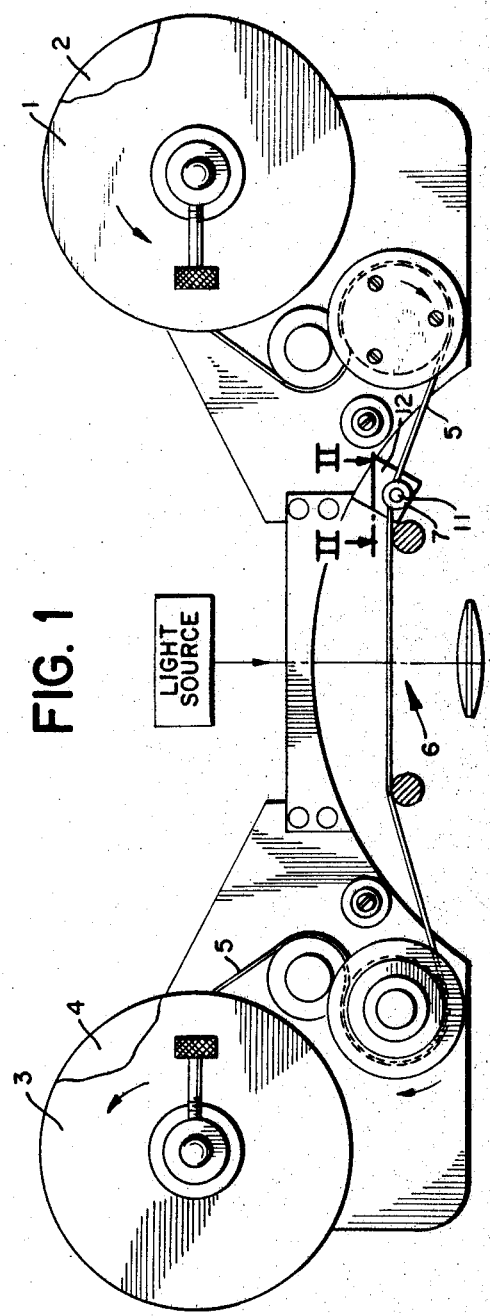
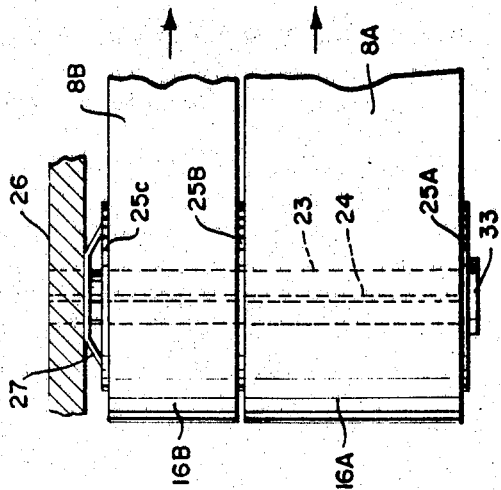
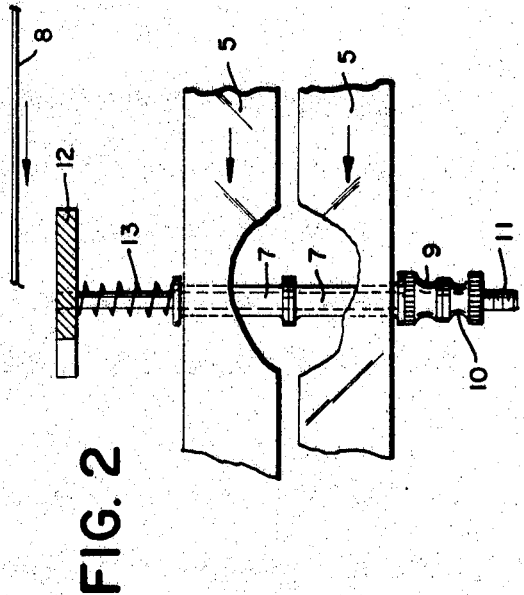
INVENTOR
FREDERIC G. LUDWIG
BY Nolte & Nolte
ATTORNEYS March 31, 1970     F. G. LUDWIG     3,503,678
FILM ALIGNMENT DEVICE AND PAPER ENGAGEMENT DEVICE
FOR PHOTOCOPY EQUIPMENT Filed March 1, 1967     2 Sheets-Sheet 2

INVENTOR.
FREDERIC G. LUDWIG
BY
*Nolte & Nolte*
ATTORNEYS

United States Patent Office 3,503,678
Patented Mar. 31, 1970

3,503,678
FILM ALIGNMENT DEVICE AND PAPER ENGAGEMENT DEVICE FOR PHOTOCOPY EQUIPMENT
Frederic G. Ludwig, Woodbridge, Conn., assignor of one-third to Albert C. Nolte, Jr., New York, N.Y.
Filed Mar. 1, 1967, Ser. No. 619,840
Int. Cl. G03b 27/48
U.S. Cl. 355—48                                          10 Claims

ABSTRACT OF THE DISCLOSURE

A film alignment device for aligning film with copy paper in photocopy esuipment comprises an adjustment roller rotatably mounted for free rotation and axial movement transverse to the film on a shaft fixedly mounted on a frame of the photocopy equipment. A spring is positioned on the shaft between the adjustment roller and the frame. An adjusting nut is threadedly coupled on the threaded free end of the shaft. A locking nut is threadedly coupled on the free end of the shaft on the other side of the adjusting nut from the adjustment roller.

---

The present invention relates to photocopy equipment. More particularly, the invention relates to a film alignment device for the film in the photocopy equipment and a paper engagement device for the copy paper in the photocopy equipment.

In photocopy equipment, adjusting means is utilized to align a rotating reel of film with a simultaneously rotating reel or roll of copy paper. The adjusting means does not function very effectively, however, due to the relatively long distance between the film supply reel and the film takeup reel. Thus, a time gap exists in the correctional adjustment of such reels, so that there is either an overalignment or an underalignment of the film in the image area of the photocopy equipment. The misalignment of the film relative to the copy paper causes a considerable waste of copy paper and requires constant supervision of the equipment while it is in operation.

The principal object of the present invention is to provide a new and improved film alignment device for photocopy equipment.

An object of the present invention is to provide a new and improved paper engagement device for photocopy equipment.

The film alignment device of the present invention prevents overalignment or underalignment of the film in the image area of photocopy equipment and provides substantialy perfect alignment of the film with the copy paper with efficiency, effectiveness and reliability.

The film alignment device of the present invention provides substantially perfect alignment of a plurality of strips of film with a plurality of strips of copy paper. The paper engagement device of the present invention provides proper engagement of the copy paper with the drag roller of the photocopy equipment with efficiency, effectiveness and reliability. The film alignment device of the present invention avoids the need for supervision once the photocopy equipment is in operation, and therefore provides considerable economy in operation. Each of the film alignment devices and the paper engagement devices of the present invention is of simple structure and is inexpensive in manufacture.

In accordance with the present invention, film alignment means is provided in photocopy equipment for projecting light through moving film onto a selenium drum, wherein the image is developed. The image is then transferred to copy paper. The film alignment means aligns the film with the copy paper and comprises adjustment means for transversely positioning the film relative to the copy paper. The adjustment means comprises adjustment roller means for the film and mounting means rotatably mounting the adjustment roller means for free rotation and axial movement transverse to the film. The mounting means comprises a shaft fixedly mounted on a frame of the photocopy equipment and a spring positioned on the shaft between the adjustment roller means and the frame. The shaft has a threaded free end. An adjusting nut is threadedly coupled on the free end of the shaft and a locking nut is threadedly coupled on the free end of the shaft with the adjusting nut positioned between the adjustment roller means and the locking nut.

In accordance with the present invention, paper engagement means is provided in photocopy equipment for projecting light through moving film onto a selenium drum, wherein the image is developed. The image is then transferred to copy paper. The paper is fed to a drag roller. The paper engagement means comprises spring loaded roller means for maintaining the copy paper in abutment with and between the drag roller and the spring loaded roller means.

In order that the present invention may be readily carried into effect, it will now be described with reference to the accompanying drawings, wherein:

FIG. 1 is a side view of a portion of photocopy equipment including an embodiment of the film alignment device of the present invention;

FIG. 2 is a view, taken along the lines II—II of FIG. 1, of the film alignment device of FIG. 1;

FIG. 5 is a top view of the paper supply reel mounting of FIG. 4; and

Figure 3:
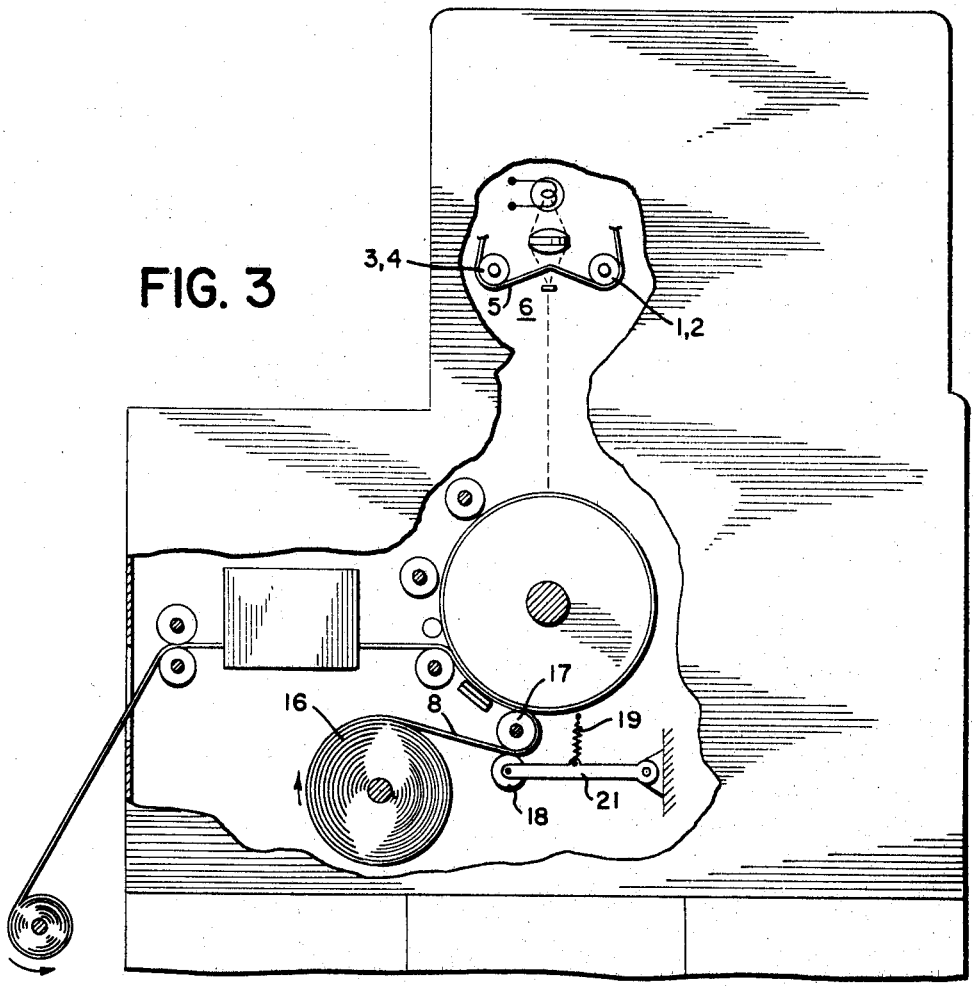
FIG. 3 is a side view of an embodiment of photocopy equipment including an embodiment of the paper engagement device of the present invention.

In the figures, the same components are identified by the same reference numerals. In FIG. 1, the photocopy equipment includes a pair of film supply reels 1 and 2 which are positioned in coaxial side by side relation and rotate in counterclockwise direction to supply film to a pair of takeup reels 3 and 4. The takeup reels 3 and 4 are positioned in coaxial side by side relation, as are the supply reels 1 and 2, in spaced relation from said supply reels and rotate in counterclockwise direction to take up the film 5 supplied by said supply reels.

The film 5 need not be provided in a single strip between a single supply reel and a single takeup reel and need not be provided in a pair of strips between a pair of supply reels and a pair of takeup reels, but may be provided in a plurality of strips between a plurality of supply reels and a plurality of takeup reels.

In accordance with the present invention, a film alignment device provides facile, efficient, effective and reliable alignment of the film 5 passing through the image area 6 of the photocopy equipment relative to the copy paper. The film alignment device comprises an adjustment roller 7 for each strip of film positioned as close as possible to the image area 6. The positioning of the adjustment rollers 7 in close proximity to the image area 6 provides rapid and instantaneous alignment of the film strips 5 with respect to the simultaneously moving copy paper 8 of the photocopy equipment.

The film alignment device of the present invention further comprises an adjusting nut 9 for transverse adjustment of the film strips 5 and a lock nut 10 for retaining the adjusting nut 9 in its adjusted position. The adjustment rollers 7 are coaxially mounted in side by side relation on a common shaft 11 for free rotation about said shaft. The free end of the shaft 11 is threaded for threaded engagement with the adjusting nut 9 and the lock nut 10.

The shaft 11 is fixedly mounted on and extends from a frame 12 of the photocopy equipment. A spring 13 is positioned on the shaft 11 between the frame 12 and the adjustment rollers 7 and functions to facilitate the adjustment of said adjustment rollers in axial position on said shaft. A second film alignment device, identical with the aforedescribed film alignment device, may be positioned on the opposite side of the image area 6 from the aforedescribed film alignment device to align the film strips 5 after they have passed through said image area. The film alignment device of the present invention is so efficient, however, that only a single unit, as described with reference to FIG. 1, aligns the film substantially perfectly with the copy paper 8 of the photocopy equipment.

The film alignment device of the present invention permits the utilization of two, three or more reels, and therefore strips, of film simultaneously. This reduces the cost of operation of the photocopy equipment by half or more and considerably reduces the labor costs for operators for such equipment. Furthermore, the utilization of two or more reels of film provides great versatility for the photocopy equipment. A wide reel or roll of copy paper 8 may be utilized to accommodate two or more reels of film simultaneously and the copy paper strip may then be cut in the direction of its length into separate copy paper strips.

In FIGS. 1 and 2, two reels of film are shown, as an example, for purposes of illustration, although the invention is not limited to a pair of film supply reels 1 and 2, and therefore a pair of film strips 5.

In operation, when one, two, or more reels or strips of film are to be copied by the photocopy equipment, the adjustment rollers 7 are manually adjusted or axially positioned or aligned transversely relative to the strips of film 5 and transversely relative to the copy paper 8, which moves simultaneously with and in the same direction as said strips of film. When the strips of film 5 are satisfactorily aligned by axial movement of the adjustment rollers 7 by adjustment of the adjusting nut 9, said adjustment rollers are locked in their alignment positions by the lock nut 10.

When the photocopy equipment is in operation, no further alignment of the film is necessary, so that no further supervision is necessary. The film is maintained in alignment with the copy paper 8, after the initial alignment thereof, during the operation of the photocopy equipment, until the film 5 and the copy paper 8 are exhausted.

FIG. 3 discloses photocopy equipment of known type such as, for example, Xerox Copyflo equipment, except that such equipment has a single film supply reel and a single film takeup reel instead of the two or more film supply reels 1 and 2 and the two or more film takeup reels 3 and 4 shown in the illustrative embodiment of the present invention. In the photocopy equipment of FIG. 3, a paper supply reel or roll 16 supplies copy paper 8 to a drag roller 17.

In accordance with another aspect of the present invention, a paper engagement device maintains the copy paper 8 in proper engagement with the drag roller 17 of the photocopy equipment. The paper engagement device comprises a spring loaded or spring biased roller 18 which is continuously urged toward the drag roller 17 by a spring 19. The urging of the spring loaded roller 18 toward the drag roller 17 by the spring 19 maintains the copy paper 8 in abutment with and between said drag roller and said spring loaded or spring biased roller so that said copy paper is maintained in engagement with said drag roller. The spring 19 is fixedly mounted at one end and is affixed at its other end to a pivotally mounted arm 21 supporting the spring loaded roller 18.

In the operation of the photocopy equipment of FIG. 3, light is projected through the moving film 5 onto a selenium drum 22, wherein the image is developed. The image is then transferred from the drum 22 to the copy paper 8.

The back drag on the copy paper 8 supplied by the paper supply reel 16 of FIG. 3 is under continually varying tension. The tension is small when the paper supply roll 16 is large in diameter, and increases as the diameter of said paper supply roll decreases and approaches the diameter of its supporting shaft. If the drag roller 17 is made to function properly by a spring loading of the shaft of the paper supply roll 16 and an increased such spring loading, the tension becomes so great at the end of said paper supply roll, when the diameter thereof is near a minimum, that the supply of copy paper is stopped completely. This results in loss of production and also subjects the selenium drum 22 to damage. This is especially the case when the copy paper is of heavy stock and when the width of such paper is insufficient to cover the drag roller 17 so that the surface contact is insufficient to enable proper operation of said drag roller.

Figure 4:
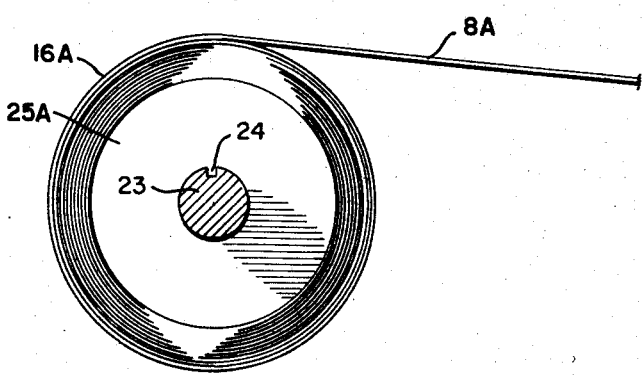
FIG. 4 is a side view of a paper supply reel mounting which is preferably utilized in the photocopy equipment of FIG. 3.

FIGS. 4 and 5 illustrate a paper supply reel mounting which is preferably utilized to mount the paper supply reel or roll 16 of FIG. 3. Two paper supply reels or rolls 16A and 16B may be coaxially positioned in adjacent side by side position on a shaft 23. The shaft 23 has slot 24 formed therein and extending substantially parallel to the axis of said shaft along the length of said shaft. Ring spacers 25A, 25B and 25C of substantially disc-like configuration are coaxially mounted on the shaft 23 on each side of each paper supply reel 16A and 16B and are keyed in the slot 24 of said shaft. The ring spacers 25A, 25B and 25C serve to center the paper supply reels 16A and 16B on the shaft 23. Neither the shaft 23 nor the keyed ring spacers 25A, 25B and 25C rotate.

Figure 6:
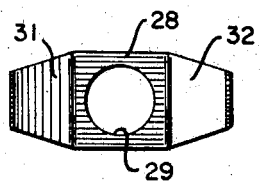
FIG. 6 is a side view of the spring 27 of FIG. 5.

The shaft 23 is non-rotatably fixedly mounted on and extends from a frame 26 of the photocopy equipment. A flat spring 27 of substantially angled U-configuration is coaxially positioned on the shaft 23 between the frame 26 and the ring spacer 25C closest to said frame. As shown in FIG. 6, the spring 27 comprises a base section 28 having an aperture 29 formed therethrough in its central area to accommodate the shaft 23. Two flap sections 31 and 32 extend from opposite sides of the base section 28 at an angle of approximately 30 to 45° with the plane of said base section. The base section 28 and each of the flap sections 31 and 32 are of flat planar configuration.

In operation, the shaft 23 passes through the aperture 29 of the spring 27 and the base section 28 of said spring abuts the frame 26. The flaps 31 and 32 of the spring 27 exert pressure on the ring spacer 25C in directions substantially parallel to the axis of the shaft 23. A retaining nut 33 holds the paper supply reels 16A and 16B and the ring spacers 25A, 25B anad 25C on the shaft 23.

The aforementioned disadvantages of the photocopy equipment of FIG. 3 are eliminated by the apparatus of FIGS. 4 and 5. The ring spacers 25A, 25B and 25C are kept stationary and are prevented from rotating, due to their keying in the slot 24 of the shaft 23. The spring loading effected by the spring 27 is utilized to position the paper supply reels 16A and 16B relative to each other and is kept to a minimum. The copy paper 8A and 8B is supplied properly and desirably and the paper engagement apparatus applies a proper and equal drag on each. The tension is prevented from increasing to the point where it stops the paper supply from the paper supply reels 16A and 16B.

While the invention has been described by means of specific examples and in specific embodiments, I do not wish to be limited thereto, for obvious modifications will occur to those skilled in the art without departing from the spirit and scope of the invention.

What is claimed is:

1. In photocopy equipment for projecting light through film for reproduction on copy paper, film alignment means for aligning said film with said copy paper, said film alignment means comprising at least one flanged roller, means supporting said roller for rotation on an axis extending transversely of the length of said film, adjustment means for transversely positioning said roller on said supporting means, and means for holding said roller in said adjusted position.

2. In photocopy equipment as claimed in claim 1, film alignment means comprising a plurality of flanged rollers for aligning a plurality of strips of film.

3. In photocopy equipment as claimed in claim 1, wherein said film alignment means further comprises locking means for locking the adjustment means thereof in position.

4. In photocopy equipment as claimed in claim 1, wherein said supporting means includes a shaft fixedly mounted on a frame of said photocopy equipment and spring means positioned on said shaft between said roller and said frame.

5. In photocopy equipment as claimed in claim 4, wherein said shaft has a threaded free end, said adjustment means further comprising an adjustment nut threadedly coupled on the free end of said shaft.

6. In photocopy equipment as claimed in claim 5, wherein said adjustment means further comprises a locking nut threadedly coupled on the free end of said shaft with said adjusting nut positioned between said adjustment roller means and said locking nut.

7. In photocopy equipment as claimed in claim 6, film alignment means comprising a plurality of flanged rollers for aligning a plurality of strips of film.

8. In photocopy equipment for projecting light through moving film for reproduction on moving copy paper the improvement comprising a drag roller, said copy paper being fed to said drag roller, paper engagement means including spring-loaded roller means for maintaining said copy paper in abutment with and between said drag roller and said spring roller means, paper supply reels for supplying said copy paper, and means for mounting said paper supply reel having a non-rotatably mounted shaft in a fixed position and non-rotatable ring spacer means coaxially mounted on said shaft, said paper supply reels being coaxially positioned on said ring spacer means.

9. In photocopy equipment as claimed in claim 8, wherein said spring loaded roller means comprises spring means fixedly mounted at one end and affixed at its other end to said spring loaded roller means.

10. In photocopy equipment as claimed in claim 8, further comprising spring means on said shaft for applying pressure to said ring spacers in directions substantially parallel to the axis of said shaft, said pressure being a minimum.

References Cited

UNITED STATES PATENTS

| | | | |
|---|---|---|---|
| 1,404,773 | 1/1922 | Hunt | 352—224 X |
| 1,828,768 | 10/1931 | Dina | 352—224 |
| 3,032,009 | 5/1962 | Magnusson | 355—16 X |
| 3,252,370 | 5/1966 | Luthur | 355—64 X |
| 3,372,617 | 3/1968 | Pfaff | 355—27 X |

NORTON ANSHER, Primary Examiner

R. A. WINTERCORN, Assistant Examiner

U.S. Cl. X.R.

226—19; 242—55.11, 57.1; 352—162, 223, 224; 355—50, 64